United States Patent Office 3,442,821
Patented May 6, 1969

3,442,821
MANUFACTURE OF SPHEROIDAL
SILICA-ALUMINA PARTICLES
Lee Hilfman, Prospect Heights, Ill., assignor to Universal
Oil Products Company, Des Plaines, Ill., a corporation
of Delaware
No Drawing. Filed Sept. 29, 1966, Ser. No. 583,094
Int. Cl. B01j *11/44, 11/34*
U.S. Cl. 252—429       6 Claims

ABSTRACT OF THE DISCLOSURE

Production of spheroidal silica-alumina particles by (a) admixing an alumina hydrosol with an acidified alkali metal silicate solution in a ratio to form a silica-alumina hydrosol comprising a major portion of silica, said alkali metal silicate solution containing chloride in from about 1.3 to about 1.8 mole ratio with the alkali metal content thereof, (b) admixing a gelling agent consisting of hexamethylenetetramine and urea with said silica-alumina hydrosol, said hexamethylenetetramine and urea being utilized in a weight ratio of from about 1/1 to about 2/1 and in an amount to provide from about 0.85 to about 2.0 equivalents of ammonia per equivalent of chloride contained in said hydrosol, (c) passing the resulting mixture in the form of droplets, and while still below gelation temperature, into an oil suspending medium maintained at from about 120° F. to about 500° F. and at a pressure to maintain the water content of the droplets in the liquid phase, retaining the droplets therein until they set to spherical gel particles, and immediately thereafter aging said spheres in an alkaline medium.

Manufacture of spheroidal silica-alumina particles

This invention relates to the manufacture of spheroidal silica-alumina particles comprising a major portion of silica. The use of inorganic oxides such as silica, alumina, silica-alumina, etc., in substantially spheroidal shape offers numerous advantages when employed as an absorbent, or as a catalyst, or component of a catalyst, for the conversion of organic compounds and especially for the conversion of hydrocarbons. When employed as a fixed bed in a reaction or contacting zone, the spherically shaped particles permit a more uniform packing, thereby reducing variations in the pressure drop through said fixed bed, and in turn reducing channeling which inherently results in a portion of the bed being by-passed.

Spheroidal inorganic oxide particles of uniform size and shape, and of uniform physical characteristics, have been manufactured by dispersing an inorganic oxide hydrosol in the form of droplets into a suitable gelling medium and, immediately thereafter, subjecting the resulting hydrogel spheres to a particular series of aging treatments in a basic medium. The gelling medium employed may be any suitable water-immiscible suspending liquid. The gelling medium is usually a light gas oil chosen principally for its high interfacial tension with respect to water. Passage of the droplets through the oil suspending medium produces two effects. First, as each droplet penetrates the oil surface it draws into a spherical shape. The droplets are principally water at this stage and, being insoluble in the oil, they tend to draw into a shape resulting in the least surface area for their volume. The second effect is that the formed spheres are given time to gel and build an initial structure while gravitating to the bottom of the suspending oil so that sufficient structural stability is established to resist the strains imposed by the transfer and subsequent treatment in the aging process. The hydrogel spheres are subjected to the aging treatment in order to impart thereto certain desirable physical characteristics. The method is generally known as the "oil-drop" method.

Alumina spheres, or alumina-containing spheres such as composites of silica and alumina, are not as readily manufactured by this method as are, for example, silica spheres which form by thermal setting without the aid of a gelling agent. While it is also possible to form silica-alumina spheres by thermal setting and without the aid of a gelling agent, this entails the use of an aluminum salt rather than an alumina sol as an alumina source. Nevertheless, an alumina sol is a preferred alumina source since it affords better average bulk density and surface area control as well as other important advantages which are not realized with an aluminum salt as a source of alumina. In order to obtain acceptable spherical particles utilizing a sol as an alumina source, it is necessary to employ a sol which will not set into a gel until a suitable time interval has elapsed. For example, when adding a conventional gelling agent, such as ammonium hydroxide, to an alumina sol a gellatinous precipitate occurs almost immediately. Thus, the desired spheroidal particles cannot be formed by the oil-drop method herein contemplated since the time differential is not sufficient to permit passing the sol into a suspending medium before gelation occurs so that the sol may assume the desired shape and gel during passage therethrough. However, alumina spheres can be manufactured by a method which comprises commingling, at below gelation temperature, an alumina hydrosol and a weak base with specific properties. It is generally considered that hexamethylenetetramine, being a weak base with a strong buffering action at a pH of from about 4 to about 10 and a rate of hydrolysis which increases with temperature is most suitable. The resultant mixture can be dispersed in the form of droplets while still below gelation temperature into an oil suspending medium maintained at an elevated temperature effecting hydrolysis of the hexamethylenetetramine and accelerating gelation of the hydrosol at a suitable rate into firm, but elastic, spheres. The method is more fully described in U.S. Patent 2,620,314 issued to James Hoekstra.

While spheroidal alumina particles of uniform size and shape and of uniform physical characteristics are conveniently and advantageously prepared in the described manner, the hexamethylenetetramine gelling agent is substantially ineffectual when the sol further comprises silica in the manufacture of spheroidal silica-alumina particles. This is particularly true with respect to the manufacture of high silica silica-alumina particles.

It is then an object of this invention to provide an improved gelling agent which, in conjunction with the other process limitations hereinafter defined, permits the manufacture of spherical silica-alumina particles comprising a major portion of silica by the oil-drop method.

It has been discovered that hexamethylenetetramine combined with urea in a particular ratio and comingled with a silica-alumina hydrosol comprising a major portion of silica, forms a mixture which can be passed as droplets into an oil suspending medium before gelation occurs and which will assume a spherical shape and form firm gel particles within a time interval compatible with the oil-drop method.

In one of its broad aspects the present invention embodies a process for the manufacture of spheroidal silica-alumina particles comprising a major portion of silica, which process comprises (a) admixing an alumina hydrosol with an acidified alkali metal silicate solution in a ratio to form a silica-alumina hydrosol comprising a major portion of silica, said alkali metal silicate solution containing chloride in from about a 1.3 to about a 1.8 mole ratio with the alkali metal content thereof, (b) admixing a gelling agent consisting of hexamethylenetetramine and urea with said silica-alumina hydrosol, said hexamethylenetetramine and urea being utilized in a weight ratio of from about 1/1 to about 2/1 and in an amount to provide from about 0.85 to about 2.0 equivalents of ammonia per equivalent of chloride contained in said hydrosol, (c) passing the resulting mixture in the form of droplets, and while still below gelation temperature, into an oil suspending medium maintained at from about 120° F. to about 500° F. and at a pressure to maintain the water content of the droplets in the liquid phase, retaining the droplets therein until they set to spherical gel particles, and immediately thereafter aging said spheres in an alkaline medium.

Other objects and embodiments of this invention will become apparent in the following detailed specification.

In the practice of this invention, a silica-alumina hydrosol is prepared by first admixing an alumina hydrosol with an acidified alkali metal silicate solution. It is well known that an alumina hydrosol may be prepared from suitable compounds of aluminum such as aluminum chloride, aluminum bromide, aluminum sulphate, aluminum alcoholate, etc. Of these, aluminum chloride, as hereinafter set forth, is most generally employed as the source of aluminum. It is understood that, although the present invention affords advantages to processes which utilize at least one of the aforementioned aluminum compounds, the results are not necessarily equivalent. The following description is directed to aluminum chloride hydrosols in view of the widespread use of such hydrosols.

The aluminum chloride hydrosol may be prepared in any conventional or otherwise convenient manner, one typical method being to commingle aluminum pellets with a quantity of treated or deionized water and adding thereto an aqueous hydrochloric acid solution sufficient to digest a portion of the aluminum metal and to establish a desired chloride level in the resulting hydrosol. A suitable reaction rate is effected at about reflux temperature of the mixture—usually 175–220° F., depending upon the size and purity of the aluminum pellets. Another suitable method commonly employed consists in adding aluminum metal to an aqueous aluminum chloride solution and heating the mixture at about reflux temperature.

The acidified alkali metal silicate with which the aluminum chloride hydrosol is commingled is obtainable by conventional methods of preparation. The alkali metal silicate employed is most often an aqueous solution of sodium silicate, commonly referred to as "water glass." Acidification with a small amount of acid such as hydrochloric acid, sulfuric acid, etc., effects hydrolysis of the water glass and the conversion to a silicic acid or silica hydrosol. The water glass is usually further diluted with water and added to a diluted acid solution while maintaining the temperature below about 60° F. to obviate polymerization of the silicic acid and premature gelation. In accordance with the present process, the alumina hydrosol is admixed with the acidified water glass solution in a ratio to form a silica-alumina hydrosol comprising a major portion of silica.

The physical characteristics of the hydrogel spheres, as well as the setting time, is influenced by the particular chloride/sodium ratio occuring in the acidified water glass, the chloride being introduced as hydrochloric acid in the manner described and the sodium being introduced as sodium silicate. Hydrogel spheres manufactured with acidified water glass containing chloride and sodium in a mol ratio of from about 1.1 to about 1.8 are firm gel particles, a preferred mol ratio being from about 1.4 to about 1.6. The chloride/sodium ratio is conveniently adjusted concurrently with acidification of the water glass solution. At a chloride/sodium ratio lower than described, soft, gummy spheres are obtained which make further processing somewhat difficult.

Proper gelatin of the silica-alumina hydrosol is further dependent upon hexamethylenetetramine and urea combined with the hydrosol in a particular weight ratio. It has been found that particularly good hydrogel spheres result with the use of hexamethylenetetramine and urea in a weight ratio of from about 1/1 to about 2/1. The hexamethylenetetramine and urea may be admixed with the hydrosol in any suitable manner. One convenient method comprises preparing hexamethylenetetramine in aqueous solution, adding the same to the alumina hydrosol and then dissolving the urea directly in the resulting hydrosol. The alumina hydrosol is thereafter admixed with the acidified alkali metal silicate in the aforementioned manner. The quantity of the particular hexamethylenetetramine-urea gelling agent employed is dependent upon the anion concentration of the hydrosol. Thus, where the hydrosol is prepared from an aluminum chloride hydrosol and water glass acidified with hydrochloric acid, the quantity of the gelling agent is dependent upon the concentration of the chloride ion in the resulting silica-alumina hydrosol. The hexamethylenetetramine-urea gelling agent comprising hexamethylenetetramine and urea within the stated weight ratio, is utilized in an amount to furnish, upon decomposition or hydrolysis, from about 1 to about 1.5 equivalents of ammonia for equivalent of anion present in the silica-alumina hydrosol, in other words, sufficient to effect from about 100% to about 150% neutralization.

The silica-alumina hydrosol thus prepared is formed into spheroidal hydrogel particles by the described oil-drop method. Thus, the spheroidal hydrogel particles are aged in hot oil—most usually the oil suspending medium utilized—for a period of at least 10 hours, and then in a suitable alkaline medium for at least 10 hours, and finally water-washed. Proper gelation of the hydrosol in the oil suspending medium, as well as subsequent aging of the hydrogel spheres, is not readily accomplished below about 120° F., and above 210° F. the rapid evolution of gases tends to rupture and otherwise weaken the spheres. By maintaining sufficient superatmospheric pressure during the forming and aging steps in order to maintain the water in a liquid phase, higher temperatures can be employed, frequently with improved results. A particularly satisfactory method is to water-wash the spheres by percolation, either with an upward or downward flow of water, and preferably with water containing a small amount of ammonium hydroxide and/or ammonium nitrate. After washing, the spheres are dried at a temperature of from about 200° F. to about 600° F. for 6–24 hours or more, and then calcined at a temperature of from about 800° F. to about 1400° F. for 2–12 hours or more.

The high silica silica-alumina spheroidal particles prepared in accordance with the method of this invention may be composited with any of the several catalytically active metallic materials in the oxidized or reduced state. Of particular interest are those catalysts comprising one or more metals of Groups VI–B and VIII including molybdenum, tungsten, chromium, iron, nickel, cobalt, platinum, palladium, ruthenium, rhodium, osmium and iridium. Thus, silica-alumina spheres prepared in accordance with the method of this invention can be utilized advantageously as a catalyst or component thereof to effect a variety of hydrocarbon conversion reactions involving reaction conditions comprising a temperature in the 70–1400° F. range. The catalysts are particularly useful in effecting the hydrocracking of heavy oils, including vacuum residuals, to form petroleum products in the middle distillate range utilizing a temperature of from about 500° F. to about 1000° F. and pressures of from about 500 p.s.i.g. to about 3000 p.s.i.g. Said hydrocarbon conversion reactions further include polymerization of olefins, particularly ethylene, propylene, 1-butene, 2-butene, isobutylene and also higher boiling olefins, at polymerization reaction conditions. The silica-alumina product is also useful as a catalyst or component thereof in effecting the alkylation of isoparaffins with olefins or other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, amylene, and higher boiling olefins including nonenes, decenes, undecenes, etc., the foregoing alkylation reactions being effected at alkylation conditions disclosed in the art. The products of this invention are further useful in the isomerization of paraffins, particularly n-butane, n-pentane, n-hexane, n-heptane, n-octane, etc., or mixtures including, isomerization of less highly branched chain saturated hydrocarbons such as the isomerization of 2- or 3-methylpentane to 2,3- and 2,2-dimethylbutane; isomerization of dimethylcyclohexane to methylcyclohexane, isomerization of methylcyclopentane to cyclohexane, etc., at isomerization reaction conditions. Other hydrocarbon conversion reactions including hydrocarbon transfer reactions, alkyl transfer reactions, transalkylation reactions, and the reforming of gasoline or naphtha to improve the anti-knock characteristics thereof, are effectively catalyzed utilizing the high silica silica-alumina spheroids as a catalyst or component thereof.

Example I

A silica-alumina hydrosol was formulated from two individual preparations which were subsequently blended together. The first preparation was a hydrosol prepared by adding 103 cc. of a 28% aqueous hexamethylenetetramine solution to 112 cc. of an aluminum chloride hydrosol and thereafter directly dissolving 26.3 g. of urea therein. The second preparation was an acidified water glass solution formulated by adding 594 cc. of chilled (40–50° F.) aqueous water glass solution with a specific gravity of approximately 1.2, to 317 cc. of a rapidly stirred 20% aqueous hydrochloric acid solution, the mixture being maintained below 60° F. The first preparation was added to the second with rapid stirring. The resulting silica-alumina hydrosol, containing chloride and sodium in a 1.8 mole ratio, was charged to the top of a forming tower and emitted as droplets into a gas oil contained therein. The forming tower, 6¼ inches in diameter and 11½ feet in length, was filled with a gas oil with a boiling point in excess of 400° F. and maintained at 212° F. The silica-alumina spheroidal hydrogel particles which accumulated at the bottom of the forming tower were firm, free-flowing gel particles suitable for further processing. The spheroidal hydrogel particles were aged in the oil at about 212° F. for about 19 hours, and then further aged in an aqueous ammonium hydroxide solution for about 2 hours at the same temperature. The spheres were thereafter water-washed and dried for 2 hours at 200–212° F., and calcined in an air atmosphere at 1250° F. for 3 hours. The silica-alumina spheres thus prepared have an average pore diameter of 67 A., a pore volume of 0.69 cc./gm., a surface area of 416 m²./gm., and an average bulk density of 0.59 gm./cc. The product spheres contained silica and alumina in a 75/25 weight ratio.

Example II

This example pertains to an attempted preparation of high silica silica-alumina spheroidal particles utilizing urea per se as a gelling agent. A silica-alumina hydrosol was formulated by substantially the same procedure described in Example I with the exception that the aqueous hexamethylenetetramine solution was omitted and 53 gms. of urea was dissolved directly in the aluminum chloride hydrosol before commingling the same with the acidified water glass solution. The resulting silica-alumina hydrosol was charged to the top of a forming tower and emitted as droplets into the hot (212° F.) gas oil contained therein. The hydrosol proved to be too stable and did not form the desired spheroidal hydrogel particles.

Example III

This example related to an attempted preparation of high silica silica-alumina spheroidal particles utilizing hexamethylenetetramine as the sole gelling agent. A silica-alumina hydrosol was formulated by substantially the same procedure described in Example I with the exception that urea was omitted and 209 cc. of 28% aqueous hexamethylenetetramine solution was added to the aluminum chloride hydrosol before commingling the same with the acidified water glass solution. Substantially instant gelation occurred upon admixing the alumina hydrosol with the acidified water glass solution.

Example IV

A high silica silica-alumina hydrosol was formulated by substantially the same procedure described in Example I with the exception that the acidified water glass was prepared by adding 594 cc. of chilled (40–50° F.) water glass, a specific gravity of about 1.2, to 238 cc. of a rapidly stirred 20% aqueous hydrochloric acid solution. Upon admixing the aluminum chloride hydrosol with the acidified water glass solution a silica-alumina hydrosol containing chloride and sodium in a 1.2 mole ratio was obtained. The resulting silica-alumina hydrosol was further processed in the manner of Example I to form spheroidal hydrogel particles. However, proper gelation was not effected and the desired spheroidal hydrogel particles were not formed even after aging for 30 minutes. The desired spheroidal hydrogel particles were subsequently formed in the desired manner by raising the chloride-sodium mole ration to about 1.4.

I claim as my invention:
1. A process for the manufacture of spheroidal silica-alumina particles comprising a major portion of silica, which process comprises:
  (a) admixing an alumina hydrosol with an acidified alkali metal silicate solution in a ratio to form a silica-alumina hydrosol comprising a major portion of silica, said alkali metal silicate solution containing chloride in from about a 1.1 to about a 1.8 mole ratio with the alkali metal content thereof,
  (b) admixing a gelling agent consisting of hexamethylenetetramine and urea with said silica-alumina hydrosol, said hexamethylenetetramine and urea being utilized in a weight ratio of from about 1/1 to about 2/1 and in an amount to provide from about 0.85 to about 2.0 equivalents of ammonia per equivalent of chloride contained in said hydrosol,
  (c) passing the resultant mixture in the form of droplets, and while still at the low gelation temperature, into an oil bath maintained at a temperature of from about 120° F. to about 500° F. and at a pressure to maintain the water content of the droplets in a substantially liquid phase, retaining the droplets therein until they set to hydrogel spheres, and immediately thereafter aging said spheres in an alkaline medium.
2. The process of claim 1 further characterized with respect to step (a) in that said acidified alkali metal silicate solution is an acidified water glass solution.
3. The process of claim 2 further characterized with respect to step (a) in that said water glass solution contains chloride in from about a 1.4 to about a 1.6 mole ratio with the sodium content thereof.
4. The process of claim 3 further characterized with respect to step (b) in that said gelling agent consists of hexamethylenetetramine and urea in a weight ratio of from about 1/1 to about 1.5/1.

5. The process of claim 4 further characterized with respect to step (b) in that said hexamethylenetetramine-urea gelling agent is utilized in an amount to provide from about 1.0 to about 1.5 equivalents of ammonia per equivalent of chloride contained in said hydrosol.

6. The process of claim 4 further characterized with respect to step (a) in that said silica-alumina hydrosol comprises silica and alumina in a 75/25 weight ratio.

References Cited

UNITED STATES PATENTS

| | | | |
|---|---|---|---|
| 2,897,159 | 7/1959 | Hoekstra et al. | 252—448 |
| 3,210,293 | 10/1965 | O'Hara | 252—453 |

DANIEL E. WYMAN, *Primary Examiner.*

C. F. DEES, *Assistant Examiner.*

U.S. Cl. X.R.

252—430, 442, 448, 453, 455